(12) United States Patent
Lau et al.

(10) Patent No.: US 6,356,561 B1
(45) Date of Patent: Mar. 12, 2002

(54) METHOD AND APPARATUS FOR THE FAIR AND EFFICIENT TRANSFER OF VARIABLE LENGTH PACKETS USING FIXED LENGTH SEGMENTS

(75) Inventors: Joseph C. Lau, Hsinchu (TW); Subhash C. Roy, Lexington, MA (US); John F. Gilsdorf, Derby, CT (US)

(73) Assignee: Transwitch Corporation, Shelton, CT (US)

( * ) Notice: Subject to any disclaimer, the term of this patent is extended or adjusted under 35 U.S.C. 154(b) by 0 days.

(21) Appl. No.: 09/561,034

(22) Filed: Apr. 28, 2000

(51) Int. Cl.$^7$ .............................. H04J 3/16; H04J 3/22
(52) U.S. Cl. .................... 370/462; 370/395.6; 370/428; 370/469
(58) Field of Search ................................ 370/229, 230, 370/231, 235, 236, 395, 428, 429, 438, 465, 466, 469, 474, 462

(56) References Cited

U.S. PATENT DOCUMENTS

| | | | | |
|---|---|---|---|---|
| 5,237,564 A | * | 8/1993 | Lespagnol et al. | 370/395 |
| 5,642,347 A | * | 6/1997 | Buckland | 370/242 |
| 5,664,116 A | * | 9/1997 | Gaytan et al. | 395/200.64 |
| 5,668,798 A | * | 9/1997 | Toubol et al. | 370/230 |
| 5,883,893 A | * | 3/1999 | Rumer et al. | 370/395 |

OTHER PUBLICATIONS

Document for the ATM Forum, "Utopia Level 2, Version 1.0 an ATM–PHY Interface Specification", Jun. 1995, 66 pages.
Webpages downloaded Jan. 17, 2000 from the Internet on PMC–Sierra addresses packet–over–Sonet functions, (2 pages).
Webpage downloaded Jan. 17, 2000 from the Internet on ASPEN: Cellbus® Access Processor Device, 1 page.
Webpage downloaded Jan. 17, 2000 from the Internet on SARA–2, 2 page.
Webpages downloaded Jan. 17, 2000 from the Internet on PHAST–12, 2 pages.

\* cited by examiner

Primary Examiner—Ricky Ngo
(74) Attorney, Agent, or Firm—David P Gordon; David S. Jacobson; Thomas A Gallagher

(57) ABSTRACT

A method for the fair and efficient transfer of variable length packets using fixed length "segments" utilizes a modified UTOPIA interface with three additional signals added, i.e. start of packet (SOP), end of packet (EOP), and most significant byte (MSB). Packets are broken into "segments" of fixed, but programmable, length. The start of a segment is marked by a pulse on the UTOPIA start of cell (SOC) signal line. The start of a packet is marked by a pulse on the SOP signal line. The end of a packet is marked by a pulse on the EOP signal line. According to a presently preferred embodiment, bytes are transferred via a 16-bit bus. When a packet ends with a single byte on the bus, the MSB signal line is asserted to distinguish it from a packet which ends with two bytes on the bus. The invention can be expanded to accommodate buses wider than 16-bits by making the EOP a multiple bit signal. The extra signals added to the standard UTOPIA interface by the invention are not involved in segment transfer. Segments are transferred in the same manner that ATM cells are transferred using standard UTOPIA technology. Rather, the extra signals are used by a PHY device to reconstruct packets which were transferred over the interface. Accordingly, a single interface according to the invention can be used to transfer both variable length packets and ATM cells.

13 Claims, 2 Drawing Sheets

METHOD AND APPARATUS FOR THE FAIR AND EFFICIENT TRANSFER OF VARIABLE LENGTH PACKETS USING FIXED LENGTH SEGMENTS

BACKGROUND OF THE INVENTION

1. Field of the Invention

The present invention relates to telecommunications. More particularly, the present invention relates to the passing of variable length packets via fixed length segments.

2. State of the Art

The first commercial digital voice communications system was installed in 1962 in Chicago, Ill. The system was called "T1" and was based on the time division multiplexing (TDM) of twenty-four telephone calls on two twisted wire pairs. The digital bit rate of the T1 system was 1.544 Mbit/sec (±200 bps), which was, in the nineteen sixties, about the highest data rate that could be supported by a twisted wire pair for a distance of approximately one mile. The cables carrying the T1 signals were buried underground and were accessible via manholes, which were, at that time in Chicago, spaced approximately one mile (actually, 6000 ft.) apart. Thus, analog amplifiers with digital repeaters were conveniently located at intervals of approximately one mile. The T1 system is still widely used today and forms a basic building block for higher capacity communication systems including T3 which transports twenty-eight T1 signals. In the early 1970s, another technology was deployed to support data networks. The technology was called "packet switching". Unlike the T1 and T3 networks, packet switching was designed for data communications only. In packet switching, a "packet" of data includes a header, a payload, and a cyclic redundancy check (CRC). The header includes addressing information as well as an indication of the length of the payload. The payload contains the actual data which is being transmitted over the network. The CRC is used for error detection. The receiver of the packet performs a calculation with the bits in the packet and compares the result of the calculation to the CRC value. If the CRC value is not the same as the result of the calculation, it means that the packet was damaged in transit. According to the packet switching scheme, the damaged packet is discarded and the receiver sends a message to the transmitter to resend the packet. One popular packet switching scheme for wide area networks (WANs), known as X.25, utilizes a packet which has a fixed payload of 128 octets. Other packet switching schemes allow variable length packets up to 64,000 octets. Frame Relay is an example of a WAN packet switching scheme which utilizes variable sized packets and Ethernet is an example of a local area network (LAN) packet switching scheme which utilizes variable sized packets.

Concurrent with the development of packet switching, several groups around the world began to consider standards for the interconnection of computer networks and coined the term "internetworking". The leading pioneers in internetworking were the founders of ARPANET (the Advanced Research Projects Network). ARPA, a U.S. Department of Defense organization, developed and implemented the transmission control protocol (TCP) and the internet protocol (IP). The TCP/IP code was dedicated to the public domain and was rapidly adopted by universities, private companies, and research centers around the world. An important feature of IP is that it allows fragmentation operations, i.e. the segmentation of packets into smaller units. This is essential to allow networks which utilize large packets to be coupled to networks which utilize smaller packets. Today, TCP/IP is the foundation of the Internet. It is used for email, file transfer, and for browsing the Worldwide Web. Moreover, the popularity of TCP/IP is so great that it is now being used for voice and video as well as data transmission.

Perhaps the most awaited, and now fastest growing technology in the field of telecommunications is known as Asynchronous Transfer Mode (ATM) technology. ATM was originally conceived as a carrier of integrated traffic, e.g. voice, data, and video. ATM utilizes fixed length packets (called "cells") of 53 octets (5 octets header and 48 octets payload). ATM may be implemented in either a LAN or a WAN. For ideal data transfer, ATM is used end to end from the data source to the data receiver. In present practice, however, most of the data traffic over the ATM network (including TCP/IP traffic) originates and terminates via another type of network having packets much larger than the fixed length ATM cell. Thus, data packets entering the ATM network must be segmented into ATM cells. These cells must be reassembled into packets as the data exits the ATM network. These processes, known as SAR (segmentation and reassembly) are performed in ATM switches at the edges of the ATM network.

Within the ATM technology, a commonly used interface specification for passing ATM cells between chips on a circuit board is the UTOPIA interface. The UTOPIA interface is specified in ATM Forum standard specification af_phy_0039.000 (UTOPIA Level 2, Version 1, June 1995) which is hereby incorporated by reference herein in its entirety. The present UTOPIA standard defines an interface between a so-called PHY (physical) device and an ATM device for the transfer of fixed length ATM cells. According to the UTOPIA standard, the PHY device is responsible for performing cell-delineation (via the header error correction (HEC) code) and for (de)scrambling the cell payload of the ATM cells. The PHY device may also perform lower level framing functions, for example, SONET framing. The ATM device is responsible for higher level functions such as buffering and scheduling ATM cells and SAR.

One of the advantages of ATM technology is that it provides for quality of service (QOS), something which is not provided for by variable length packet switching schemes. When multiplexing variable length packets, a particularly long packet will cause a delay for all of the other packet streams. Due to the tremendous popularity of the Internet, it is desirable to provide methods and apparatus for transferring variable length IP packets in a fair and efficient manner.

SUMMARY OF THE INVENTION

It is therefore an object of the invention to provide methods and apparatus for the transfer of variable length packets.

It is also an object of the invention to provide an interface for the transfer of variable length packets which is fair in allowing multiple ports to receive a fair share of the total throughput.

It is another object of the invention to provide an interface for the transfer of variable length packets which maximizes throughput regardless of packet length.

It is still another object of the invention to provide an interface for the transfer of variable length packets which minimizes packet delay regardless of packet length.

It is yet another object of the invention to provide an interface for the transfer of variable length packets which is readily adapted to existing devices.

In accord with these objects which will be discussed in detail below, the interface according to the present invention uses a UTOPIA interface which is modified to add three additional signals: start of packet (SOP), end of packet (EOP), and most significant byte (MSB). According to the methods of the invention, packets are broken into segments of fixed, but programmable, length, e.g. 8 to 64 bytes. The start of a segment is marked by a pulse on the start of cell (SOC) signal line. The end of a segment is known because of the programmed fixed segment length. The start of a packet is marked by a pulse on the SOP signal line. The end of a packet is marked by a pulse on the EOP signal line. According to a presently preferred embodiment of the invention, bytes are transferred via a 16-bit bus. When a packet ends with a single byte on the bus, the MSB signal line is asserted to distinguish it from a packet which ends with two bytes on the bus, the last byte being a zero byte. The invention can be expanded to accommodate buses wider than 16-bits by making the EOP a multiple bit signal (e.g., two bits for a 32-bit wide bus).

The extra signals added to the standard UTOPIA interface by the invention are not involved in segment transfer. Segments are transferred in the same manner that ATM cells are transferred using standard UTOPIA technology. Rather, the extra signals are used by a PHY device to reconstruct packets which were transferred over the interface. Accordingly, a single interface according to the invention can be used to transfer both variable length packets and ATM cells. When transferring ATM cells, the additional signals are simply not used and the PHY device thereby treats the data as ATM cells rather than as segments. Moreover, since the SOC signal is independent from the SOP signal, packets can begin on any most significant byte of a segment and end on any byte of a segment. In other words, when a packet ends inside a segment, a new packet can begin inside the same segment.

According to the invention, the interface supports multiple PHY ports fairly by interleaving segments from different sources (or destined for different sinks) on an arbitrated basis such as a round-robin basis. Throughput is thereby allocated fairly and efficiently. It is not necessary to complete the transfer of a packet before transfer of another packet can begin. Delay is thereby reduced. This also allows the use of smaller buffers for packet traffic since packets will not be delayed beyond a predictable duration.

An apparatus according to the invention includes the modified UTOPIA interface described above (having three additional signal lines), one or more buffers, and logic for performing the method (segmenting and reassembling segments, arbitrating among ports, and asserting the signal lines at the appropriate times).

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
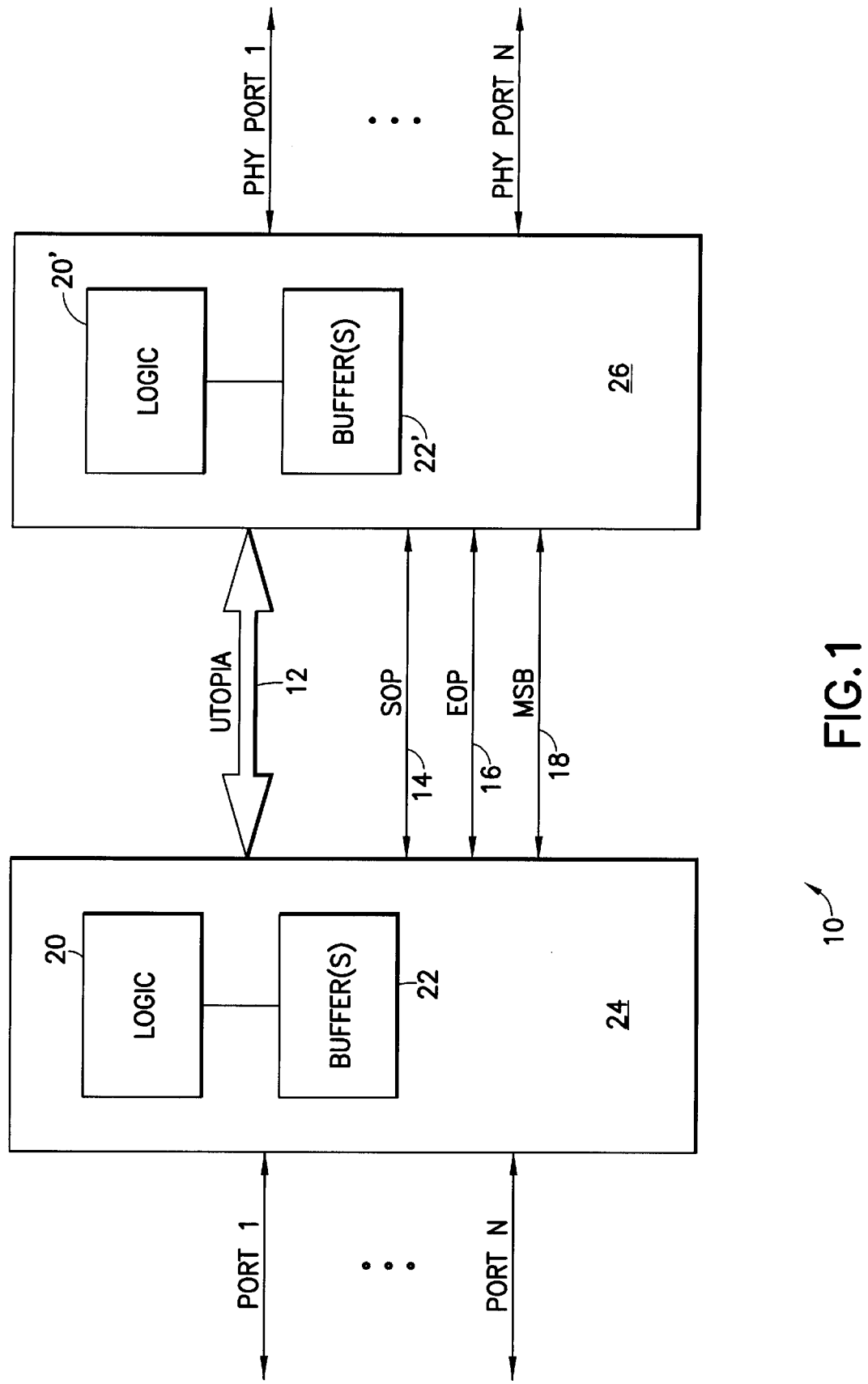
FIG. 1 is a simplified block diagram of an apparatus according to the invention.

Referring now to FIG. 1, an apparatus 10 according to the invention includes a UTOPIA interface 12 which is modified by the addition of three signal lines 14, 16, 18, control logic 20, 20' and buffers 22, 22'. As shown in FIG. 1, the logic 20 and the buffer(s) 22 are associated with a packet source 24 having multiple ports, PORT 1 . . . PORT N. The logic 20' and buffer(s) 22' are associated with a PHY device 26 having multiple ports, PHY PORT 1 . . . PHY PORT N. As with the conventional UTOPIA interface, additional devices may be coupled to the same modified UTOPIA bus. According to the invention, these devices may include multiple PHY devices, multiple packet devices and multiple ATM devices.

According to the invention, the three additional signal lines 14, 16, 18 are used to indicate start of packet (SOP), end of packet (EOP), and most significant byte (MSB). According to the methods of the invention, packets entering the packet device 24, via the ports PORT 1 . . . PORT N, are buffered in buffer(s) 22 prior to being transferred over the interface to the PHY device 26. The logic 20 is programmed (preferably hard wired) to segment packets into fixed length segments. According to the presently preferred embodiment, the segments may be as small as 8 bytes or as large as 64 bytes.

When segments are transferred over the interface from the packet device 24 to the PHY device 26, the logic 20 asserts the standard UTOPIA start of cell (SOC) signal line (contained within 12 in FIG. 1) at the start of each segment. The logic 20' determines the end of a segment by the fixed segment length. According to the invention, when a segment is the first segment of a segmented packet, the logic 20 asserts the SOP signal line 14. When a segment is the last segment of a segmented packet, the logic 20 asserts the EOP signal line 16. According to a presently preferred embodiment of the invention, bytes are transferred via a 16-bit bus (in accord with the UTOPIA standard). When a packet ends with a single byte on the bus, the logic 20 asserts the MSB signal line 18 to distinguish it from a packet which ends with two bytes on the bus. It will be appreciated that the logic 20' in the PHY device 26 utilizes these signals to reconstruct the packets from the segments sent by the packet device 24. The packets can then be sent via any of the PHY PORTs to another device for further transport and/or processing.

As mentioned above, the actual transfer of segments across the modified UTOPIA interface is accomplished in the same manner as the transfer of ATM cells. The three additional signals are not used to transfer the data, but are used to reassemble segments into packets. Thus, the interface according to the invention can be used as a standard UTOPIA interface to transfer ATM cells in addition to transferring variable length packets in segments. Further, as mentioned above, segments from different packet streams can be multiplexed by interleaving with each other and can be interleaved with ATM cells as well. Such arbitration is performed by the logic 20. Also, since the SOC signal is independent from the SOP signal, packets can begin on any most significant byte of a segment and end on any byte of a segment. In other words, when a packet ends inside a segment, a new packet can begin inside the same segment.

Figure 2:
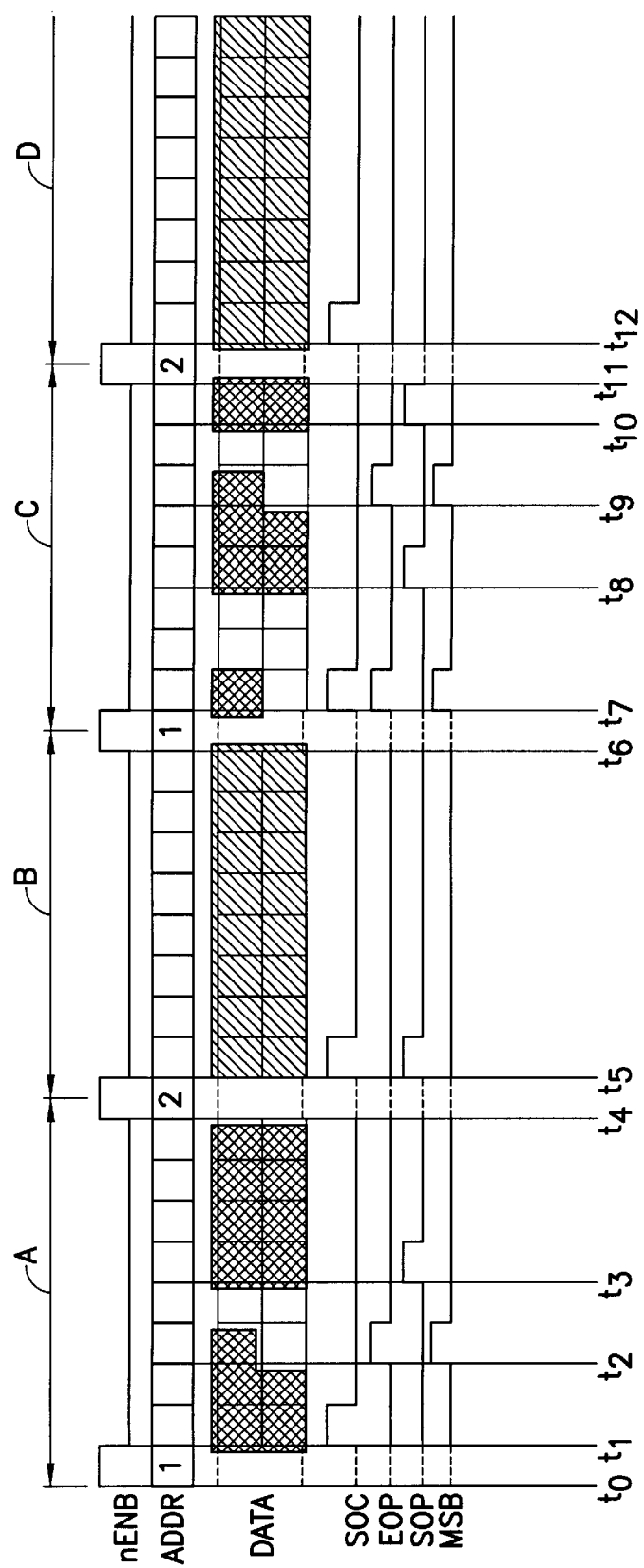
FIG. 2 is a schematic timing diagram illustrating methods of the invention.

FIG. 2 illustrates how the standard UTOPIA signals and the three additional signals are used to transfer segments from two packet streams according to the invention. In FIG. 2, four segments (A, B, C, D) are transferred, two (A and C) to PHY PORT "1" and two (B and D) to PHY PORT "2". The ports are selected by asserting their address when the nEnb signal is high. In this example, the segment size is sixteen bytes which are transferred two bytes per clock cycle. Segment A includes five bytes which form the end of a packet and eight bytes which form the start of a new packet. Segment B is sixteen bytes forming the start of a new packet. Segment C includes one byte forming the end of the packet started in segment A, a complete five byte packet, and two bytes starting a new packet. Segment D is sixteen bytes continuing the packet started in segment B.

Referring now to the time notation $t_0$–$t_{12}$ in FIG. 2, each of the signals will be explained in sequence. At time $t_0$, the transmitter asserts the address "1" so that the following transmission is understood by the receiver to be destined for PHY PORT "1". At the next clock cycle $t_1$, the transmitter asserts the SOC line to indicate the start of a segment or an ATM cell. The receiver understands whether the transmission is a segment or a cell based upon the previous transmission(s), i.e. if the SOP signal has been asserted and no EOP signal has been received since, the transmission is understood to be a segment. Simultaneously, at $t_1$, the transmitter transmits two bytes. Two-byte transmissions follow until $t_2$, when a single byte is transmitted. The single byte represents the end of a packet and accordingly the transmitter asserts the EOP signal as well as the MSB signal. Following the end of this packet in segment A, there is a sixteen bit gap (or sixteen bits of fill which are discarded by the receiver) during a single clock cycle after which, at $t_3$, a new packet is begun. The start of the new packet at $t_3$ is accompanied by the assertion of the SOP line. Data transmissions continue until the end of segment A at $t_4$. A next segment, segment B, is addressed for PHY PORT "2" by the assertion of that address at $t_4$. At the next clock cycle, $t_5$, the SOC and SOP lines are asserted, indicating that the following data is the start of a packet and the start of a segment. For the next eight clock cycles, two bytes are transmitted each cycle. Segment B ends at $t_6$ whereupon the transmitter asserts the address line of PHY PORT "1" signalling that the next transmission is destined for that port. At $t_7$ a single byte is transmitted and the SOC, EOP, and MSB lines are asserted. These signals indicate, respectively, the start of segment C, the end of the packet started in segment A, and that the transmission contains only a single byte. Two clock cycles pass with no data (fill) in the segment. At time $t_8$ a new packet is begun as signalled by the asserted SOP line. This packet is only five bytes and ends at $t_9$ with the EOP and MSB lines asserted. After three bytes of fill, a new packet is started at $t_{10}$ with the SOP line asserted during the last word of segment C. Finally, according to this example, address "2" is asserted at $t_{11}$ and another segment begun at $t_{12}$ with the SOC line asserted.

Those skilled in the art will appreciate that other signals will be involved in the transfer of segments over the modified UTOPIA interface including standard UTOPIA polling signals to determine whether a segment can be transferred, abort signals, and CRC error signals. Those signals are explained in the previously incorporated UTOPIA Standards document. Those skilled in the art will also appreciate that the invention can be expanded to accommodate data buses wider than 16-bits by making the EOP (or MSB) signal a multiple bit signal.

It will further be appreciated that the invention permits the mixing of segments from multiple sources according to any desired arbitration scheme such as round robin or another mechanism. According to the invention, the multiplexing and arbitration of multiple sources is performed by the logic 20 as described above. Moreover, it will be appreciated that multiple segments may be mixed with multiple ATM cells. The logic 20' recognizes when a transmission is an ATM cell rather than a segment in the following manner. If the SOP signal has never been asserted, the SOC signal is interpreted as the start of an ATM cell. If the SOP signal is asserted simultaneously with the SOC signal or has been previously asserted whith an EOP signal yet detected, the SOC signal is interpreted as a start of segment indicator.

There have been described and illustrated herein methods and apparatus for the fair and efficient transfer of variable length packets. While particular embodiments of the invention have been described, it is not intended that the invention be limited thereto, as it is intended that the invention be as broad in scope as the art will allow and that the specification be read likewise. Thus, while particular names have been given to the additional signal lines, it will be appreciated that other names could be utilized. Also, while a certain number of physical ports have been shown, it will be recognized that more or fewer ports could be serviced by the invention. Further, while a round robin arbitration has been disclosed as preferred, other more complicated arbitration could be used. It will therefore be appreciated by those skilled in the art that yet other modifications could be made to the provided invention without deviating from its spirit and scope as so claimed.

What is claimed is:

1. An apparatus for the fair and efficient transfer of variable length packets, comprising:
   a) a modified UTOPIA interface having first and second additional signal lines;
   b) at least one buffer, coupled to said modified UTOPIA interface, for storing packets awaiting transfer;
   c) segmenting means, coupled to said at least one buffer, for segmenting packets into fixed length segments;
   d) assertion means, coupled to said first and second additional signal lines for asserting said first additional signal line when a segment on said interface is the start of a packet and for asserting said second additional signal line when a segment on said interface is the end of a packet.

2. An apparatus according to claim 1, wherein:
   said modified UTOPIA interface has a two byte data path and a third additional signal line, and
   said assertion means is coupled to said third additional signal line and is for asserting said third additional signal line when only one byte is transferred over said two byte data path.

3. An apparatus according to claim 1, further comprising:
   e) arbitration means coupled to said at least one buffer for arbitrating among a plurality of sources of variable length packets.

4. An apparatus according to claim 3, wherein:
   said arbitration means is a round robin arbitrator.

5. An apparatus according to claim 1, wherein:
   each of said segments has a fixed length of between eight bytes and sixty-four bytes.

6. An apparatus according to claim 5, wherein:
   each of said segments has a fixed length of sixteen bytes.

7. A method for the fair and efficient transfer of variable length packets, comprising:
   a) modifying a standard UTOPIA interface by adding first and second additional signal lines;
   b) segmenting the packets into fixed length segments;
   c) transferring the segments, one at a time, over the modified UTOPIA interface;
   d) asserting the first additional signal line when a segment contains the start of a packet; and
   e) asserting the second additional signal line when a segment contains the end of a packet.

8. A method according to claim 7, wherein:
   the UTOPIA interface has a two byte data path,
   said step of modifying includes adding a third additional signal line, and said method further includes f) asserting the third additional signal line when only one byte is transferred over the two byte data path.

9. A method according to claim 7, further comprising:

f) buffering a plurality of sources of variable length packets; and g) arbitrating among the plurality of sources of variable length packets.

10. A method according to claim 9, wherein:

said step of arbitrating is a round robin arbitrating.

11. A method according to claim 7, wherein:

said step of segmenting includes segmenting the packets into segments having a fixed length of between eight bytes and sixty-four bytes.

12. A method according to claim 11, wherein:

said step of segmenting includes segmenting the packets into segments having a fixed length of sixteen bytes.

13. A method according to 7, further comprising:

f) transmitting ATM cells, one at a time, over the modified UTOPIA interface; and g) distinguishing between ATM cells and segments by remembering whether the first and second additional signal lines have been asserted.

\* \* \* \* \*